(12) United States Patent
Gong et al.

(10) Patent No.: US 12,670,510 B2
(45) Date of Patent: Jun. 30, 2026

(54) RECOMMENDATIONS TO PROMOTE CONTENT DISCOVERY

(71) Applicant: Roblox Corporation, San Mateo, CA (US)

(72) Inventors: Xiaohong Gong, Sunnyvale, CA (US); Yilei He, San Mateo, CA (US); Sui Huang, San Mateo, CA (US); Dhivya Vijayakumar, San Mateo, CA (US); Nemanja Petrovic, Belgrade (RS)

(73) Assignee: Roblox Corporation, San Mateo, CA (US)

( * ) Notice: Subject to any disclaimer, the term of this patent is extended or adjusted under 35 U.S.C. 154(b) by 0 days.

(21) Appl. No.: 18/820,731

(22) Filed: Aug. 30, 2024

(65) Prior Publication Data

US 2025/0078116 A1      Mar. 6, 2025

Related U.S. Application Data

(60) Provisional application No. 63/535,920, filed on Aug. 31, 2023.

(51) Int. Cl.
G06Q 30/0251          (2023.01)
(52) U.S. Cl.
CPC .............................. G06Q 30/0254 (2013.01)
(58) Field of Classification Search
CPC .......... H04N 21/44218; G06Q 30/0244; G06F 16/9535; G06F 16/23
See application file for complete search history.

(56) References Cited

U.S. PATENT DOCUMENTS

| | | | | |
|---|---|---|---|---|
| 2016/0110755 A1* | 4/2016 | Smirnov | ............ | G06Q 30/0244 |
| | | | | 705/14.43 |
| 2016/0188725 A1* | 6/2016 | Wang | .................. | G06F 16/9535 |
| | | | | 707/734 |
| 2016/0353166 A1* | 12/2016 | Arsenault | ........ | H04N 21/44218 |
| 2017/0161618 A1* | 6/2017 | Swaminathan | ......... | G06F 16/23 |

OTHER PUBLICATIONS

Abdollahpouri et al (Controlling Popularity Bias in learning-to-Rank Recommendation, RecSys'17, Aug. 27-31, 2017, Como, Italy) (Year: 2017).*
Zhongzhou Liu and Yuan Fang (Mitigating Popularity Bias for Users and Items with Fairness-centric Adaptive Recommendation) (Year: 2023).*

(Continued)

*Primary Examiner* — Saba Dagnew
(74) *Attorney, Agent, or Firm* — IP Spring

(57)          ABSTRACT

Some implementations relate to a computer-implemented method that includes identifying candidate content items from a set of eligible content items. The computer-implemented method further includes assigning a corresponding rank to each of the candidate content items using an objective function that mitigates a popularity bias among the candidate content items. The computer-implemented method further includes determining an impression-distribution mix of the ranked candidate content items. The computer-implemented method further includes causing one or more of the ranked candidate content items to be displayed based on the impression-distribution mix.

17 Claims, 8 Drawing Sheets

(56) References Cited

OTHER PUBLICATIONS

Himan Abdollahpouri, et al., "Managing Popularity Bias in Recommender Systems with Personalized Re-ranking", FLAIRS '19, arXiv:1901.07555v4 [cs.IR], May 18-22, 2019, 6 Pages.

MatevžKunaver, et al., "Diversity in recommender systems—A survey", Knowledge-Based Systems, vol. 123, Feb. 8, 2017, pp. 154-162.

\* cited by examiner

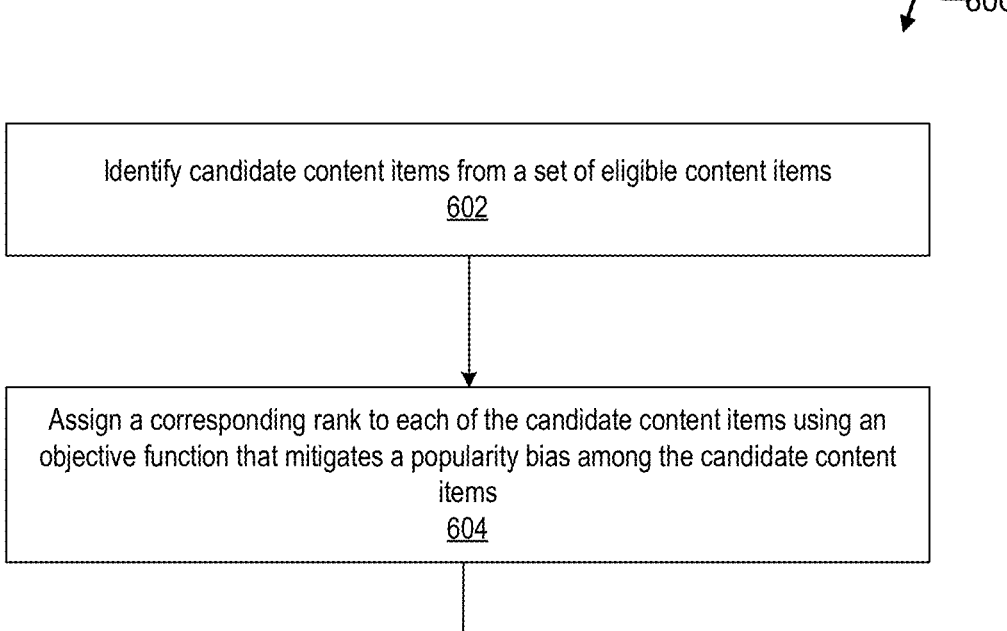

600

Identify candidate content items from a set of eligible content items
602

Assign a corresponding rank to each of the candidate content items using an objective function that mitigates a popularity bias among the candidate content items
604

Determine an impression-distribution mix of the ranked candidate content items
606

Cause one or more of the ranked candidate content items to be displayed based on the impression-distribution mix
608

FIG. 6

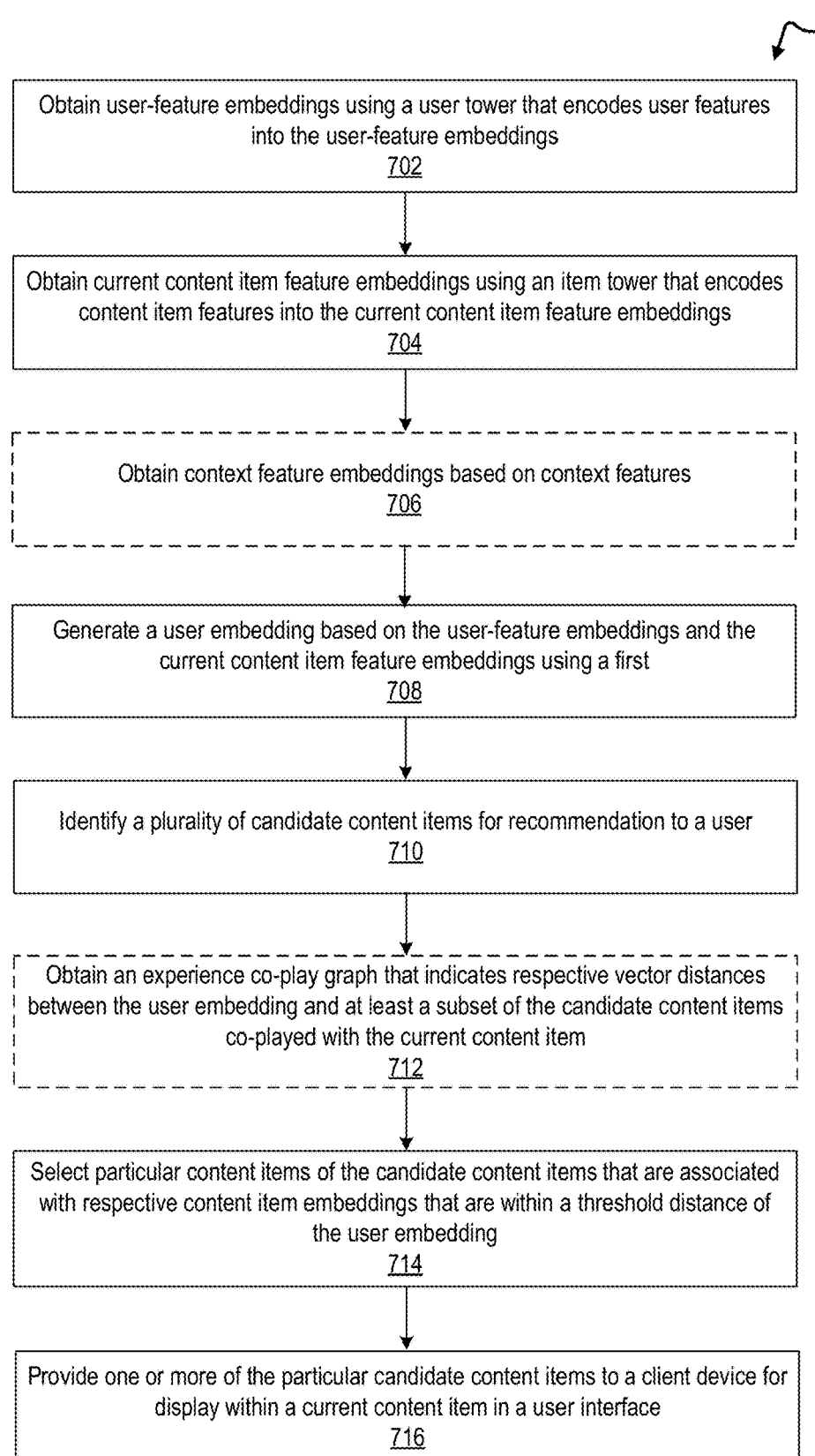

~700

Obtain user-feature embeddings using a user tower that encodes user features
into the user-feature embeddings
702

Obtain current content item feature embeddings using an item tower that encodes
content item features into the current content item feature embeddings
704

Obtain context feature embeddings based on context features
706

Generate a user embedding based on the user-feature embeddings and the
current content item feature embeddings using a first
708

Identify a plurality of candidate content items for recommendation to a user
710

Obtain an experience co-play graph that indicates respective vector distances
between the user embedding and at least a subset of the candidate content items
co-played with the current content item
712

Select particular content items of the candidate content items that are associated
with respective content item embeddings that are within a threshold distance of
the user embedding
714

Provide one or more of the particular candidate content items to a client device for
display within a current content item in a user interface
716

FIG. 7

RECOMMENDATIONS TO PROMOTE CONTENT DISCOVERY

CROSS-REFERENCE TO RELATED APPLICATIONS

This application is a non-provisional application that claims priority under 35 U.S.C. § 119(e) to U.S. Provisional Patent Application No. 63/535,920, filed on Aug. 31, 2023, the contents of which are hereby incorporated by reference herein in its entirety.

TECHNICAL FIELD

This disclosure relates generally to computer-based virtual experiences, and more particularly but not exclusively, relates to methods, systems, and computer readable media to recommend content items.

BACKGROUND

Recommender systems are a tool to identify relevant items for a user. A recommender system can recommend products to customers, suggest similar products to those that a customer has already purchased, and/or recommend products that a customer might be interested in based on their activity. Some recommender systems utilize user-item interactions as input signals to identify items of interest to a user. Recommender systems can be used by businesses to increase sales and/or improve customer satisfaction. Recommender systems can also be used by individuals to make decisions, e.g., related to purchases.

Some current recommender systems personalize recommendations on a per-user basis based on signals such as historical interactions and user similarities. Such recommender systems primarily optimize for user engagement balanced with monetization. However, in some cases, such optimization can impact the broader ecosystem negatively, e.g., the recommendations provided by the recommender systems can lead to patterns of short-term engagement optimization. A manifestation of that is popular virtual experiences (or other content items) get recommended often, while niche content items are underrepresented. Some current recommender systems exhibit popularity bias, favoring more established and globally popular content over the lesser-known content.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a computer-implemented is provided. The computer-implemented method includes identifying candidate content items from a set of eligible content items. The computer-implemented method includes assigning a corresponding rank to each of the candidate content items using an objective function that mitigates a popularity bias among the candidate content items. The computer-implemented method includes determining an impression-distribution mix of the ranked candidate content items. The computer-implemented method includes causing one or more of the ranked candidate content items to be displayed based on the impression-distribution mix.

In some implementations, the objective function includes an inverse dominance term to mitigate the popularity bias among the candidate content items.

In some implementations, the objective function includes a parameter value that controls an amount of mitigation for the popularity bias.

In some implementations, determining the impression-distribution mix includes determining the impression-distribution mix using a proportional-integral-derivative (PID) controller.

In some implementations, the candidate content items are identified using a plurality of candidate generators.

In some implementations, the plurality of candidate generators includes two or more of a retention-based candidate generator, a semantic-similarity candidate generator, an engagement-similarity candidate generator, a behavior-similarity candidate generator, or user-data candidate generator.

In some implementations, the computer-implemented method may include inputting noise into the plurality of candidate generators. In some implementations, a number of content items in the set of eligible content items is higher with the noise input than without the noise input.

According to another aspect of the present disclosure, a non-transitory computer-readable medium with instructions stored thereon that, when executed by one or more hardware processors, cause the one or more hardware processors to perform operations is provided. The operations include identifying candidate content items from a set of eligible content items. The operations include assigning a corresponding rank to each of the candidate content items using an objective function that mitigates a popularity bias among the candidate content items. The operations include determining an impression-distribution mix of the ranked candidate content items. The operations include causing one or more of the ranked candidate content items to be displayed based on the impression-distribution mix.

In some implementations, the objective function includes an inverse dominance term to mitigate the popularity bias among the candidate content items.

In some implementations, the objective function includes a parameter value that controls an amount of mitigation for the popularity bias.

In some implementations, determining the impression-distribution mix includes determining the impression-distribution mix using a proportional-integral-derivative (PID) controller.

In some implementations, the candidate content items are identified using a plurality of candidate generators.

In some implementations, the plurality of candidate generators includes two or more of a retention-based candidate generator, a semantic-similarity candidate generator, an engagement-similarity candidate generator, a behavior-similarity candidate generator, or user-data candidate generator.

In some implementations, the operations include inputting noise into the plurality of candidate generators. In some implementations, a number of content items in the set of eligible content items is higher with the noise input than without the noise input.

According to a further aspect of the present disclosure, a computing device is provided. The computing device includes one or more hardware processors. The computing device includes a non-transitory computer readable medium coupled to the one or more hardware processors, with instructions stored thereon, that when executed by the one or more hardware processors to perform operations. The operations include identifying candidate content items from a set of eligible content items. The operations include assigning a corresponding rank to each of the candidate content items using an objective function that mitigates a popularity bias among the candidate content items. The operations include determining an impression-distribution mix of the ranked candidate content items. The operations include causing one or more of the ranked candidate content items to be displayed based on the impression-distribution mix.

In some implementations, the objective function includes an inverse dominance term to mitigate the popularity bias among the candidate content items.

In some implementations, the objective function includes a parameter value that controls an amount of mitigation for the popularity bias.

In some implementations, determining the impression-distribution mix includes determining the impression-distribution mix using a proportional-integral-derivative (PID) controller.

In some implementations, the candidate content items are identified using a plurality of candidate generators.

In some implementations, the plurality of candidate generators includes two or more of a retention-based candidate generator, a semantic-similarity candidate generator, an engagement-similarity candidate generator, a behavior-similarity candidate generator, or user-data candidate generator.

In some implementations, the operations include inputting noise into the plurality of candidate generators. In some implementations, a number of content items in the set of eligible content items is higher with the noise input than without the noise input.

According to still another aspect of the present disclosure, another computer-implemented method is provided. The computer-implemented method includes obtaining user-feature embeddings using a user tower that encodes user features into the user-feature embeddings. The computer-implemented method includes obtaining current content item feature embeddings using an item tower that encodes content item features into the current content item feature embeddings. The computer-implemented method includes generating a user embedding based on the user-feature embeddings and the current content item feature embeddings using a first DNN. The computer-implemented method includes identifying a plurality of candidate content items for recommendation to a user. The computer-implemented method includes selecting particular content items of the candidate content items that are associated with respective content item embeddings that are within a threshold distance of the user embedding. The computer-implemented method includes providing one or more of the particular candidate content items to a client device for display within a current content item in a user interface.

In some implementations, the computer-implemented method further includes obtaining context feature embeddings based on context features. In some implementations, generating the user embedding using the first DNN is further based on the context feature embeddings.

In some implementations, obtaining the context feature embeddings is performed using an attention model.

In some implementations, the context features include at least one of client device capabilities or user-sequence features.

In some implementations, the user-sequence features include a time-ordered list of user engagement activities.

In some implementations, the first DNN is from a first tower of a two tower model that includes a second trained DNN from a second tower. In some implementations, the first DNN and the second trained DNN are trained to output user embeddings and content item embeddings, respectively, that are close in vector space for user-content item pairs that have a groundtruth association and that are distant in vector space for user-content item pairs that do not have the groundtruth association.

In some implementations, the computer-implemented method further includes obtaining an experience co-play graph that indicates respective vector distances between the user embedding and at least a subset of the candidate content items co-played with the current content item. In some implementations, selecting the particular content items is based on the respective vector distances in the experience co-play graph.

According to yet another aspect of the present disclosure, a non-transitory computer-readable medium with instructions stored thereon that, when executed by one or more hardware processors, cause the one or more hardware processors to perform operations is provided. The operations include obtaining user-feature embeddings using a user tower that encodes user features into the user-feature embeddings. The operations include obtaining current content item feature embeddings using an item tower that encodes content item features into the current content item feature embeddings. The operations include generating a user embedding based on the user-feature embeddings and the current content item feature embeddings using a first DNN. The operations include identifying a plurality of candidate content items for recommendation to a user. The operations include selecting particular content items of the candidate content items that are associated with respective content item embeddings that are within a threshold distance of the user embedding. The operations include providing one or more of the particular candidate content items to a client device for display within a current content item in a user interface.

In some implementations, the operations further include obtaining context feature embeddings based on context features. In some implementations, generating the user embedding using the first DNN is further based on the context feature embeddings.

In some implementations, obtaining the context feature embeddings is performed using an attention model.

In some implementations, the context features include at least one of client device capabilities or user-sequence features.

In some implementations, the user-sequence features include a time-ordered list of user engagement activities.

In some implementations, the first DNN is from a first tower of a two tower model that includes a second trained DNN from a second tower. In some implementations, the first DNN and the second trained DNN are trained to output user embeddings and content item embeddings, respectively, that are close in vector space for user-content item pairs that have a groundtruth association and that are distant in vector space for user-content item pairs that do not have the groundtruth association.

In some implementations, the operations further include obtaining an experience co-play graph that indicates respective vector distances between the user embedding and at least a subset of the candidate content items co-played with the current content item. In some implementations, selecting the particular content items is based on the respective vector distances in the experience co-play graph.

According to yet a further aspect of the present disclosure, a computing device is provided. The computing device may include one or more hardware processors. The computing device may include a non-transitory computer readable medium coupled to the one or more hardware processors, with instructions thereon, that when executed by the one or more hardware processors to perform operations. The operations include obtaining user-feature embeddings using a user tower that encodes user features into the user-feature embeddings. The operations include obtaining current content item feature embeddings using an item tower that encodes content item features into the current content item feature embeddings. The operations include generating a user embedding based on the user-feature embeddings and the current content item feature embeddings using a first DNN. The operations include identifying a plurality of candidate content items for recommendation to a user. The operations include selecting particular content items of the candidate content items that are associated with respective content item embeddings that are within a threshold distance of the user embedding. The operations include providing one or more of the particular candidate content items to a client device for display within a current content item in a user interface.

In some implementations, the operations further include obtaining context feature embeddings based on context features. In some implementations, generating the user embedding using the first DNN is further based on the context feature embeddings.

In some implementations, obtaining the context feature embeddings is performed using an attention model.

In some implementations, the context features include at least one of client device capabilities or user-sequence features.

In some implementations, the user-sequence features include a time-ordered list of user engagement activities.

In some implementations, the first DNN is from a first tower of a two tower model that includes a second trained DNN from a second tower. In some implementations, the first DNN and the second trained DNN are trained to output user embeddings and content item embeddings, respectively, that are close in vector space for user-content item pairs that have a groundtruth association and that are distant in vector space for user-content item pairs that do not have the groundtruth association.

In some implementations, the operations further include obtaining an experience co-play graph that indicates respective vector distances between the user embedding and at least a subset of the candidate content items co-played with the current content item. In some implementations, selecting the particular content items is based on the respective vector distances in the experience co-play graph.

BRIEF DESCRIPTION OF THE DRAWINGS

FIG. 6 is a flowchart illustrating a first example method to recommend content items, in accordance with some implementations.

FIG. 7 is a flowchart illustrating a second example method to recommend content items, in accordance with some implementations.

DETAILED DESCRIPTION

Figure 1:
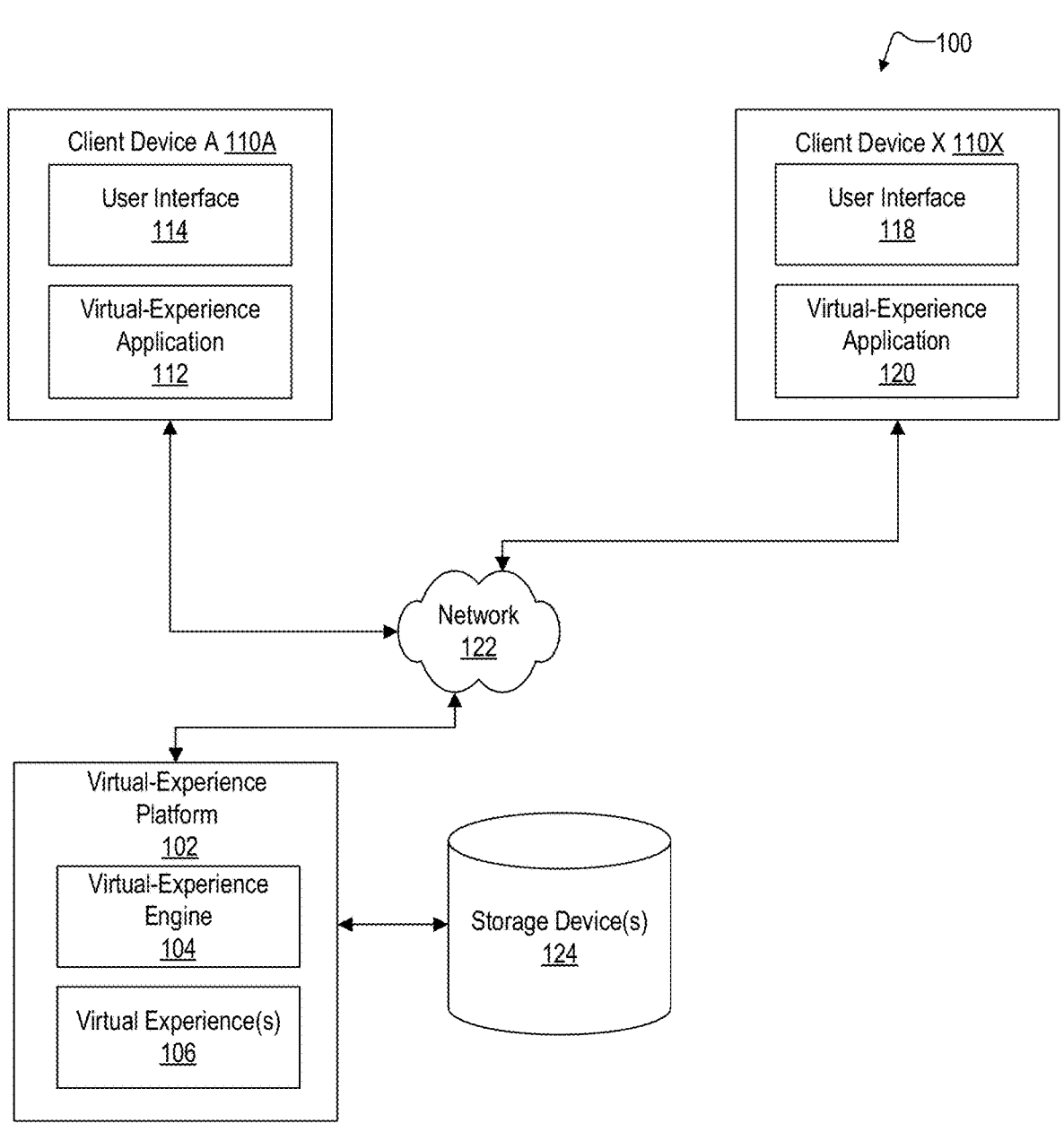
FIG. 1 is a diagram of an example system architecture, in accordance with some implementations.

A virtual-experience platform (virtual environment) may host a large number of virtual experiences (e.g., thousands, or millions of virtual experiences). The virtual experiences may be created by a large number of developers (creators). The platform may have a large number of users, e.g., hundreds of millions of users. As a two-sided platform, the virtual-experience platform can benefit from creating a virtuous cycle where users and developers/creators reinforce each other, such that developers create more content (virtual experiences, developer items, etc.) and users are more engaged with the content which improves developer rewards. Recommender systems (RS) play a crucial role in promoting this virtuous cycle via greater developer and creator engagement, since both users and creators benefit from a high quality recommender system that enables them to establish connections and discover content.

The systems, methods, and computer-readable media described herein provide recommender system that takes the broader ecosystem into account throughout the various stages of a decision funnel. The technical benefits of this strategy include that such a recommender system can provide fairer opportunities for more suitable experiences to reach a core and sustainable audience of users, and correspondingly, enhance the value proposition of the platform to the creator community. Such a recommender system can also ensure virtual experiences (and other content items) that are already popular continue to deliver value sustainably, earning recommendation impressions.

The recommender system can also enhance user experience of participating on a virtual experience platform by assisting users in discovering new interests, thus fostering long-term user engagement. The recommender system can redirect a fraction of the recommendations provided to users away from the most popular experiences to promote discovery. Such recommendations can provide a path towards a more engaging and rewarding user experience and a vibrant ecosystem on the virtual experience platform.

According to one aspect of the present disclosure, a computer-implemented is provided. The computer-implemented method includes identifying candidate content items from a set of eligible content items. The computer-implemented method includes assigning a corresponding rank to each of the candidate content items using an objective function that mitigates a popularity bias among the candidate content items. The computer-implemented method includes determining an impression-distribution mix of the ranked candidate content items. The computer-implemented method includes causing one or more of the ranked candidate content items to be displayed based on the impression-distribution mix.

According to another aspect of the present disclosure, another computer-implemented method is provided. The computer-implemented method includes obtaining user-feature embeddings using a user tower that encodes user features into the user-feature embeddings. The computer-implemented method includes obtaining current content item feature embeddings using an item tower that encodes content item features into the current content item feature embeddings. The computer-implemented method includes generating a user embedding based on the user-feature embeddings and the current content item feature embeddings using a first DNN. The computer-implemented method includes identifying a plurality of candidate content items for recommendation to a user. The computer-implemented method includes selecting particular content items of the candidate content items that are associated with respective content item embeddings that are within a threshold distance of the user embedding. The computer-implemented method includes providing one or more of the particular candidate content items to a client device for display within a current content item in a user interface.

Example System Architecture

FIG. 1 is a diagram of an example system architecture 100 that includes a 3D environment platform that can support construction and presentation of 3D objects, in accordance with some implementations. In the example of FIG. 1, the 3D environment platform will be described in the context of a virtual-experience platform 102 purely for purposes of explanation, and various other implementations can provide other types of 3D environment platforms, such as online meeting platforms, virtual reality (VR) or augmented reality (AR) platforms, or other types of platforms that can provide 3D content. The description provided herein for the virtual-experience platform 102 and other elements of the system architecture 100 can be adapted to be operable with such other types of 3D environment platforms.

Virtual-experience platforms (also referred to as "user-generated content platforms" or "user-generated content systems") offer a variety of ways for users to interact with one another, such as while the users are playing an electronic virtual experience. For example, users of a virtual-experience platform may work together towards a common goal, share various virtual gaming items, send electronic messages to one another, and so forth. Users of a virtual-experience platform may play virtual experiences using characters, such as the 3D avatars, which the users can navigate through a 3D world rendered in the electronic virtual experience.

A virtual-experience platform may also enable users of the platform to create and animate avatars, as well as enabling the users to create other graphical objects to place in the 3D world. For example, users of the virtual-experience platform may be allowed to create, design, and customize the avatar, and to create other 3D objects for presentation in the 3D world.

In FIG. 1, the example system architecture 100 (also referred to as "system" herein) includes the virtual-experience platform 102, a first client device 110a and at least one second client device X 110X (generally referred to as "client device(s) 110" herein). The virtual-experience platform 102 can include, among other things, a virtual-experience engine 104 and one or more electronic virtual experiences 106. The system architecture 100 is provided for illustration of one possible implementation. In other implementations, the system architecture 100 may include the same, fewer, more, or different elements configured in the same or different manner as that shown in FIG. 1.

A communication network 122 may be used for communication between the virtual-experience platform 102 and the client devices 110, and/or between other elements in the system architecture 100. The network 122 may include a public network (e.g., the Internet), a private network (e.g., a local area network (LAN) or wide area network (WAN)), a wired network (e.g., Ethernet network), a wireless network (e.g., an 802.11 network, a Wi-Fi network, or wireless LAN (WLAN)), a cellular network (e.g., a long term evolution (LTE) network), routers, hubs, switches, server computers, or a combination thereof.

The client device 110A can include a virtual-experience application 112 and one or more user interfaces 114 (e.g., audio/video input/output devices). Similarly, the client device X 100X can include a virtual-experience application 120 and user interfaces 118 (e.g., audio/video input/output devices). The audio/video input/output devices can include one or more of a microphone, speakers, headphones, display device, camera, etc.

The system architecture 100 may further include one or more storage devices 124. The storage device 124 may be, for example, a storage device located within the virtual-experience platform 102 or communicatively coupled to the virtual-experience platform 102 via the network 122 (such as depicted in FIG. 1). The storage devices 124 may store, for example, graphical objects that are rendered in the virtual experience 106 by the virtual-experience engine 104 or by the virtual-experience applications 112/120, as well as the configuration/properties information of the graphical objects.

In some embodiments, the storage devices 124 can be part of one or more separate content delivery networks that provide the graphical objects rendered in the virtual experience 106. For instance, an avatar creator can publish avatar templates in a library accessible at a first storage device, and other 3D object creators can (separately and independently from the avatar creator) publish 3D objects in a library accessible at a second storage device. Then, the virtual-experience application 112 may pull (or have pushed to it) graphical objects (avatars and other 3D objects) stored in the first/second storage devices, for computation/compilation at runtime for presentation during the course of playing the virtual experience.

In one implementation, the storage device 124 may be a non-transitory computer readable memory (e.g., random access memory), a cache, a drive (e.g., a hard drive), a flash drive, a database system, or another type of component or device capable of storing data and other content. The storage device 124 may also include multiple storage components (e.g., multiple drives or multiple databases) that may also span multiple computing devices (e.g., multiple server computers).

In some implementations, the virtual-experience platform 102 can include a server having one or more computing devices (e.g., a cloud computing system, a rackmount server, a server computer, cluster of physical servers, etc.). In some implementations, a server may be included in the virtual-experience platform 102, be an independent system, or be part of another system or platform.

In some implementations, the virtual-experience platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the virtual-experience platform 102 and to provide a user with access to virtual-experience platform 102. The virtual-experience platform 102 may also include a website (e.g., a web page) or application back-end software that may be used to provide a user with access to content provided by virtual-experience platform 102. For example, a user may access virtual-experience platform 102 using the virtual-experience application 112 on the client device 110.

In some implementations, virtual-experience platform 102 may be a type of social network providing connections between users or a type of user-generated content system that allows users (e.g., end-users or consumers) to communicate with other users on the virtual-experience platform 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, virtual-experience platform 102 may be a virtual gaming platform. For example, the gaming platform may provide single-player or multiplayer virtual experiences to a community of users that may access or interact with virtual experiences using client devices 110 via the network 122. In some implementations, virtual experiences (also referred to as "video virtual experience," "online virtual experience," or "virtual virtual experience" etc. herein) may be two-dimensional (2D) virtual experiences, three-dimensional (3D) virtual experiences (e.g., 3D user-generated virtual experiences), virtual reality (VR) virtual experiences, or augmented reality (AR) virtual experiences, for example. In some implementations, users may participate in virtual experiences with other users. In some implementations, a virtual experience may be played in real-time with other users of the virtual experience.

In some implementations, virtual experiences may refer to interaction of one or more players using client devices (e.g., the client device 110) within a virtual experience (e.g., the virtual experience 106) or the presentation of the interaction on a display or other user interfaces (e.g., the user interface 114/118) of a client device 110.

In some implementations, the virtual experience 106 can include an electronic file that can be executed or loaded using software, firmware or hardware configured to present the virtual experience content (e.g., digital media item) to an entity. In some implementations, the virtual-experience application 112 may be executed and the virtual experience 106 rendered in connection with the virtual-experience engine 104. In some implementations, the virtual experience 106 may have a common set of rules or common goal, and the environments of a virtual experience 106 share the common set of rules or common goal. In some implementations, different virtual experiences may have different rules or goals from one another.

In some implementations, virtual experiences may have one or more environments (also referred to as "gaming environments" or "virtual environments" herein) where multiple environments may be linked. An example of an environment may be a 3D environment. The one or more environments of the virtual experience 106 may be collectively referred to a "world" or "gaming world" or "virtual world" or "universe" herein. For example, a user may build a virtual environment that is linked to another virtual environment created by another user. A character of the virtual virtual experience (such as a 3D avatar) may cross the virtual border to enter the adjacent virtual environment.

It may be noted that 3D environments or 3D worlds use graphics that provide a three-dimensional representation of geometric data representative of virtual experience content (or at least present virtual experience content to appear as 3D content whether or not 3D representation of geometric data is used). 2D environments or 2D worlds use graphics that provide two-dimensional representation of geometric data representative of virtual experience content.

In some implementations, the virtual-experience platform 102 can host one or more virtual experiences 106 and can permit users to interact with the virtual experiences 106 using the virtual-experience application 112 of the client device 110. Users of the virtual-experience platform 102 may play, create, interact with, or build virtual experiences 106, communicate with other users, and/or create and build objects (e.g., also referred to as "item(s)" or "virtual experience objects" or "virtual virtual experience item(s)" or "graphical objects" herein) of virtual experiences 106. For example, in generating user-generated virtual items, users may create characters, animation for the characters, decoration for the characters, one or more virtual environments for an interactive virtual experience, or build structures used in the virtual experience 106, among others. In some implementations, users may buy, sell, or trade virtual experience virtual virtual experience objects, such as in-platform currency (e.g., virtual currency), with other users of the virtual-experience platform 102.

In some implementations, virtual-experience platform 102 may transmit virtual experience content to virtual-experience applications (e.g., the virtual-experience application 112). In some implementations, virtual experience content (also referred to as "content" herein) may refer to any data or software instructions (e.g., virtual experience objects, virtual experience, user information, video, images, commands, media item, etc.) associated with virtual-experience platform 102 or virtual-experience applications. In some implementations, virtual experience objects (e.g., also referred to as "item(s)" or "objects" or "virtual virtual experience item(s)" herein) may refer to objects that are used, created, shared, or otherwise depicted in the virtual experience 106 of the virtual-experience platform 102 or virtual-experience applications 112 or 120 of the client devices 110. For example, virtual experience objects may include a part, model, character or components thereof (like faces, arms, lips, etc.), tools, weapons, clothing, buildings, vehicles, currency, flora, fauna, components of the aforementioned (e.g., windows of a building), and so forth.

It may be noted that the virtual-experience platform 102 hosting virtual experiences 106, is provided for purposes of illustration. In some implementations, virtual-experience platform 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, the virtual experience 106 may be associated with a particular user or a particular group of users (e.g., a private virtual experience), or made widely available to users of the virtual-experience platform 102 (e.g., a public virtual experience). In some implementations, where virtual-experience platform 102 associates one or more virtual experiences 106 with a specific user or group of users, virtual-experience platform 102 may associate the specific user(s) with a virtual experience 106 using user account information (e.g., a user account identifier such as username and password).

In some implementations, virtual-experience platform 102 or client devices 110 may include the virtual-experience engine 104 or virtual-experience application 112/120. In some implementations, virtual-experience engine 104 may be used for the development or execution of virtual experiences 106. For example, virtual-experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual-experience engine 104 may generate commands that help compute and render the virtual experience (e.g., rendering commands, collision commands, animation commands, physics commands, etc.). In some implementations, virtual-experience applications 112/118 of client devices 110 may work independently, in collaboration with virtual-experience engine 104 of virtual-experience platform 102, or a combination of both, in order to perform the operations described herein related to creating and presenting 3D objects.

In some implementations, both the virtual-experience platform 102 and client devices 110 execute a virtual-experience engine 104 or a virtual-experience application 112, 120, respectively. The virtual-experience platform 102 using virtual-experience engine 104 may perform some or all the virtual-experience engine functions (e.g., generate physics commands, animation commands, rendering commands, etc.), or offload some or all the virtual-experience engine functions to the virtual-experience application 112 of client device 110. In some implementations, each virtual experience 106 may have a different ratio between the virtual-experience engine functions that are performed on the virtual-experience platform 102 and the virtual-experience engine functions that are performed on the client devices 110.

For example, the virtual-experience engine 104 of the virtual-experience platform 102 may be used to generate physics commands in cases where there is a collision between at least two virtual experience objects, while the additional virtual-experience engine functionality (e.g., generate rendering commands) may be offloaded to the client device 110. In some implementations, the ratio of virtual-experience engine functions performed on the virtual-experience platform 102 and client device 110 may be changed (e.g., dynamically) based on virtual experience conditions. For example, if the number of users participating in a particular virtual experience 106 exceeds a threshold number, the virtual-experience platform 102 may perform one or more virtual-experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the virtual-experience platform 102. Subsequent to receiving control instructions from the client devices 110, the virtual-experience platform 102 may send virtual experience instructions (e.g., position and velocity information of the characters participating in the virtual experience or commands, such as rendering commands, collision commands, etc.) to the client devices 110 based on control instructions. For instance, the virtual-experience platform 102 may perform one or more logical operations (e.g., using virtual-experience engine 104) on the control instructions to generate virtual experience instruction for the client devices 110. In other instances, virtual-experience platform 102 may pass one or more or the control instructions from one client device 110 to other client devices participating in the virtual experience 106. The client devices 110 may use the virtual experience instructions and render the virtual experience for presentation on the displays of client devices 110.

In some implementations, the control instructions may refer to instructions that are indicative of in-virtual experience actions of a user's character. For example, control instructions may include user input to control the in-virtual experience action, such as right, left, up, down, user selection, gyroscope position and orientation data, force sensor data, etc. The control instructions may include character position and velocity information. In some implementations, the control instructions are sent directly to the virtual-experience platform 102. In other implementations, the control instructions may be sent from the client device 110 to another client device, where the other client device generates instructions using the local virtual-experience application 120. The control instructions may include instructions to play a voice communication message or other sounds from another user on an audio device (e.g., speakers, headphones, etc.), for example voice communications or other sounds generated using the audio spatialization techniques as described herein.

In some implementations, virtual experience instructions may refer to instructions that allow the client device 110 to render a virtual experience, such as a multiplayer virtual experience. The virtual experience instructions may include one or more of user input (e.g., control instructions), character position and velocity information, or commands (e.g., physics commands, animation commands, rendering commands, collision commands, etc.).

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the virtual-experience platform 102 at any given moment. It may be noted that the number of client devices 110 is provided as illustration, rather than limitation. In some implementations, any number of client devices 110 may be used.

In some implementations, each client device 110 may include an instance of the virtual-experience application 112 or 120. In one implementation, the virtual-experience application 112 or 120 may permit users to use and interact with virtual-experience platform 102, such as control a virtual character in a virtual experience hosted by virtual-experience platform 102, or view or upload content, such as virtual experiences 106, images, video items, web pages, documents, and so forth. In one example, the virtual-experience application may be a web application (e.g., an application that operates in conjunction with a web browser) that can access, retrieve, present, or navigate content (e.g., virtual character in a virtual environment, etc.) served by a web server. In another example, the virtual-experience application may be a native application (e.g., a mobile application, app, or a gaming program) that is installed and executes local to client device 110 and allows users to interact with virtual-experience platform 102. The virtual-experience application may render, display, or present the content (e.g., a web page, a media viewer) to a user. In an implementation, the virtual-experience application may also include an embedded media player) that is embedded in a web page.

According to aspects of the disclosure, the virtual-experience application 112/120 may be an virtual-experience application for users to build, create, edit, upload content to the virtual-experience platform 102 as well as interact with virtual-experience platform 102 (e.g., play virtual experiences 106 hosted by virtual-experience platform 102). As such, the virtual-experience application 112/120 may be provided to the client device 110 by the virtual-experience platform 102. In another example, the virtual-experience application may be an application that is downloaded from a server.

In some implementations, a user may login to virtual-experience platform 102 via the virtual-experience application. The user may access a user account by providing user account information (e.g., username and password) where the user account is associated with one or more characters available to participate in one or more virtual experiences 106 of virtual-experience platform 102.

In general, functions described in one implementation as being performed by the virtual-experience platform 102 can also be performed by the client device(s) 110, or a server, in other implementations if appropriate. In addition, the functionality attributed to a particular component can be performed by different or multiple components operating together. The virtual-experience platform 102 can also be accessed as a service provided to other systems or devices through appropriate application programming interfaces (APIs), and thus is not limited to use in websites.

Multi-Stage Recommender

Figure 2:
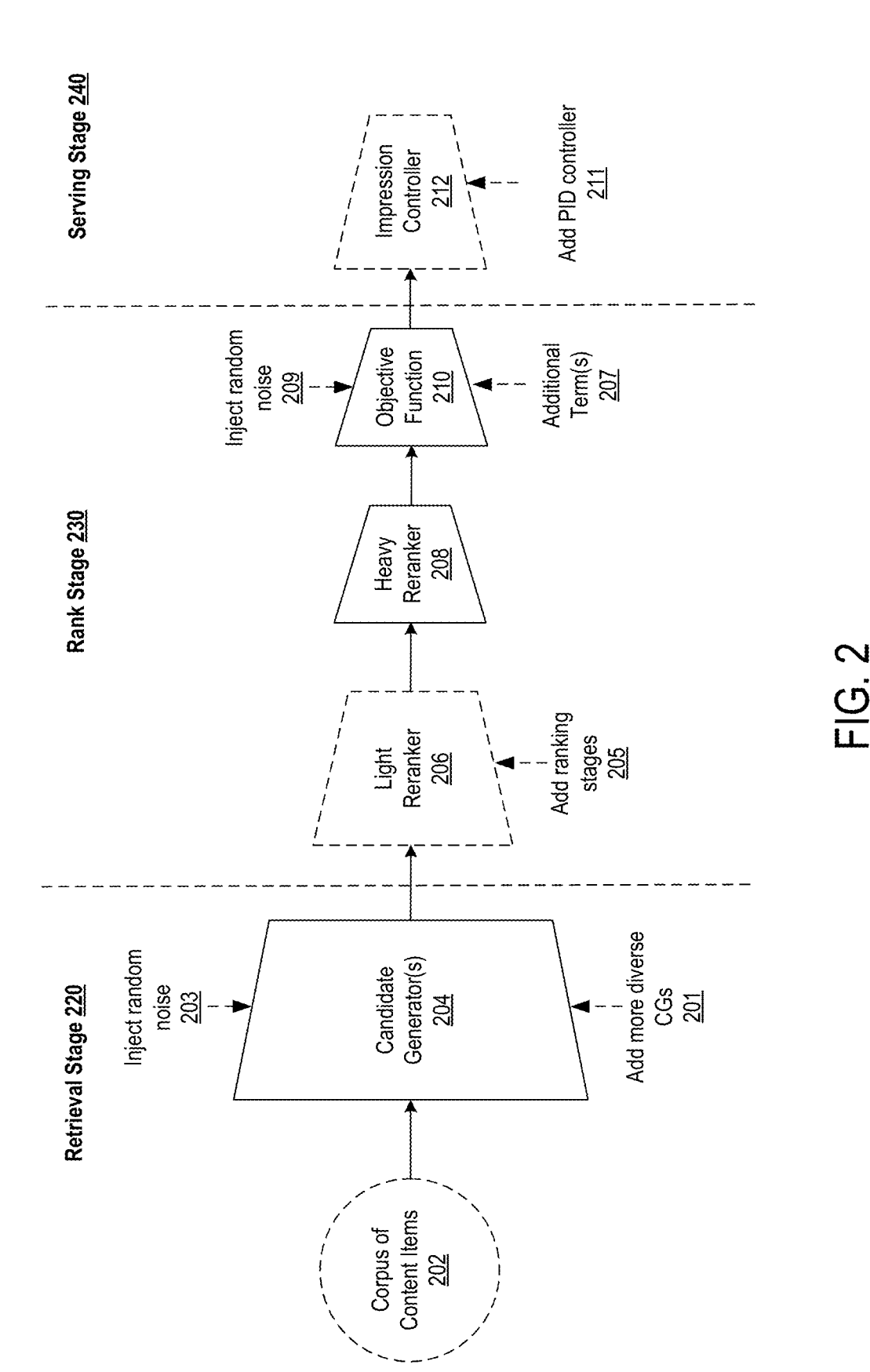
FIG. 2 illustrates an example multi-stage recommender system, in accordance with some implementations.

FIG. 2 illustrates a multi-stage recommender system 200, in accordance with some implementations. The recommender system includes a retrieval stage 220 in which candidate content items (e.g., virtual experiences, developer items, etc.) to be recommended are identified, a ranking stage 230 in which ranks are assigned to the identified content items, and a serving stage 240 where selected content items (e.g., based on the rank) are served as recommendations to be displayed to users. The present disclosure provides different strategies to incorporate ecosystem information at different stages of the recommender system 200, e.g., retrieval, ranking and serving stages.

In some implementations, the recommender system 200 may be implemented as part of a virtual-experience application 112/120 and/or part of virtual-experience engine 104. While the description herein refers to recommendations of content items in the context of a virtual-experience platform (virtual environment) that includes virtual experiences, the techniques described herein are usable in any recommendation context, e.g., where the content items have semantic information (in one or modalities such as text, image, video, etc.).

Retrieval Stage 220

Per techniques of this disclosure, candidate generators 204 (that identify candidate items for recommendation) are diversified to broaden the reach of the recommender in the corpus of content items 202 (e.g., corpus of virtual experiences on the platform).

The recommender system 200 includes a plurality of candidate generators 204. While some candidate generators 204 may be optimized to identify candidate items to be recommended that promote greater engagement and monetization, using only this type of content generator can lead to over-homogeneity in the candidate generation process. Per techniques of this disclosure, additional candidate generators 204 are incorporated (at 201) in the recommender system 200.

For example, the candidate generators 204 may include a retention-based candidate generator. A retention-based candidate generator can be based on signals regarding retention, e.g., whether a user that participated in a virtual experience (e.g., after selecting a recommended experience) continued to stay engaged with the virtual experience. In another example, the candidate generators 204 may include a candidate generator that is learned from virtual experience co-play signals (e.g., joint play of virtual experiences by two or more users). Further, candidate generators 204 may be based on semantic similarities between virtual experiences. Semantic similarity may be determined based on text, images, video, etc. associated with virtual experiences. For example, learned embeddings (e.g., that are based on multimodal data about virtual experiences, including text, image, video, game assets, etc.) can be used in candidate generation. The use of learned embeddings can enhance the likelihood that diverse experiences are part of the recommendation funnel.

Other examples of candidate generators 204 that add more diverse virtual experiences to the recommendation funnel include candidate generators that are based on engagement similarities across virtual experiences, behavior similarity among users, etc. In some implementations, random noise may be injected (at 203) into the candidate generators 204 to promote likelihood of discovery of virtual experiences that may otherwise not enter the recommendation funnel.

Still further, some candidate generators 204 can be based on other data. For example, a candidate generator may incorporate information about first-time payers (users that pay for a virtual experience or a developer item associated with the virtual experience), e.g., after being recommended the virtual experience, based on the amount the user spends on the virtual-experience platform, etc.

Ranking Stage 230

In some implementations, if the use of additional candidate generators results in an increased cost to serve recommendations (e.g., due to the need to select from a larger initial set of identified virtual experiences), a lightweight ranker 206 can be added (at 205) in the ranking stage 230. The lightweight ranker 206 can be implemented to triage the number of virtual experiences identified by candidate generators 204 before inputting them into the heavy reranker 208.

The objective function used in a traditional recommender system typically optimizes for two objectives, e.g., namely, user engagement and monetization. However, such objective functions fail to take into account aggregate information at the ecosystem level, e.g., the impression concentration, the fungibility of content items, etc.

Per techniques of this disclosure, the objective function 210 is updated (at 207) to include an additional term (inverse_dominance_term) to balance the impression distribution for overall ecosystem health (including engagement of creators and users). The inverse_dominance_term is introduced to combat the popularity feedback loop (where popular virtual experiences are recommended more often, and thereby, become more popular, thus reinforcing the popularity). An example objective function is shown below:

$$E[\text{value}|\text{impression}] + \text{alpha} * E[\text{playtime}|\text{impression}] + \text{beta} * \text{inverse\_dominance\_term}$$

The inverse_dominance_term can be defined in any suitable way (e.g., 1/log (rec_imps_7d) where rec_imps_7d are the recorded impressions over a 7-day period) to give less weight to experiences that are recommended more often and to boost under-explored ones. The parameter beta controls the strength of mitigation for the popularity bias of the recommender system 200. The inverse_dominance_term can adjust the impression numbers based on popularity and can reduce the likelihood of popular experiences dominating recommendations to be generated by the recommender system 200.

Further, as shown in FIG. 2, random noise can also be injected (at 209) in the objective function 210 to promote serendipity in the discovery mechanism. For example, dithering can be used as a noise injection mechanism. The addition of serendipity into the recommender system 200 via the random noise enables a broader part of the catalog (e.g., of virtual experiences available on the platform) to be included in the recommendation funnel and can also generate less biased data that enables learning content and impression incrementality.

Serving Stage 240

Further, a Proportional-Integral-Derivative (PID) controller can be added (at 211) to the impression controller 212 to optimize the serving stage 240. The incorporation of a PID controller can provide the flexibility to achieve a particular target impression distribution mix in the recommendations that are served to users. The PID controller can adjust the impressions from each group at serving time to meet the target percentages. Adjusting the target impression distribution mix can change the likelihood of different virtual experiences being recommended. The PID controller can also enable data analysis to identify the target distributions for different content cohorts.

The recommender system 200 may be evaluated using suitable operational metrics that measure the effectiveness of the recommender system 200 in increasing the representation across the catalog in the recommendations that are served to users. The metric can incorporate diversity-related metrics (e.g., head and long-tail diversity) of the recommendations.

The techniques described herein can provide a dynamic and principles-based solution to control the impression distribution in recommended content items and can improve the overall ecosystem-level health.

In-Experience Recommender

Figure 3:
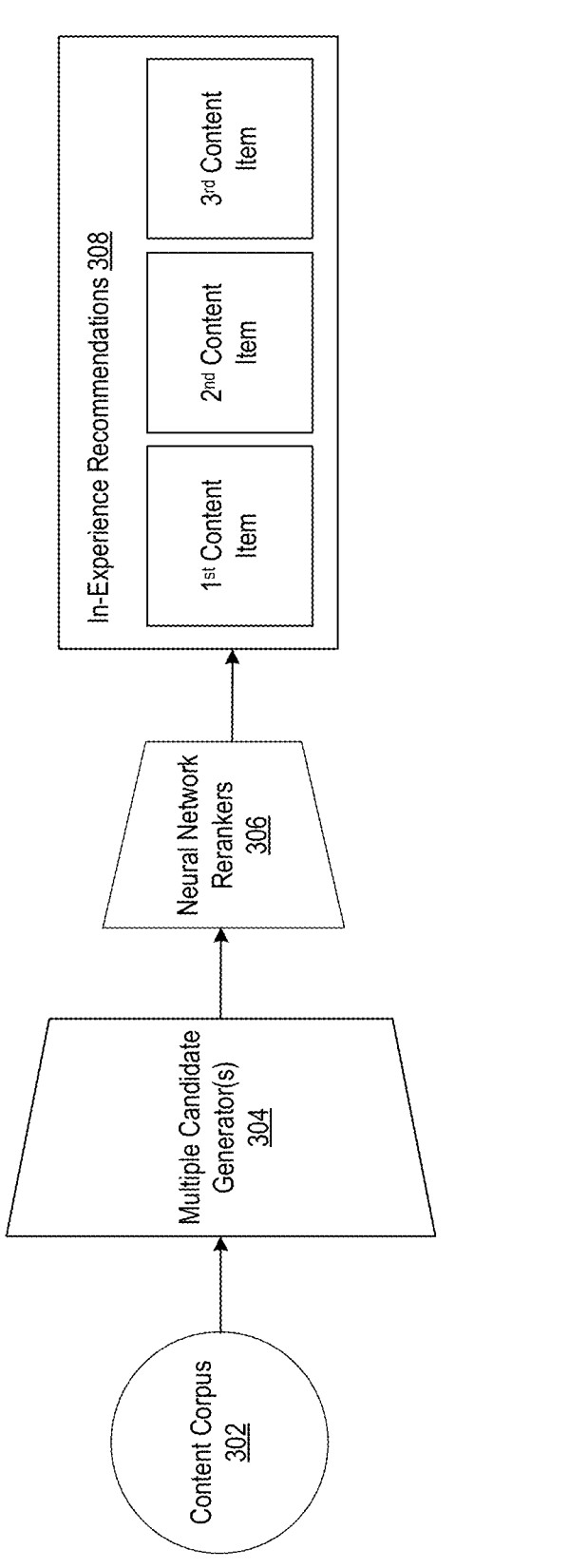
FIG. 3 illustrates an in-experience recommender system, in accordance with some implementations.

FIG. 3 illustrates an in-experience recommender system 300, in accordance with some implementations. To improve user engagement on the virtual experience platform, this disclosure provides a recommender system 300 that recommends similar content items (e.g., virtual experiences) within a current content item that a user is playing. For instance, the recommender system 300 allows one or more recommended content items to be linked to the current content item. The recommender system 300 may be a multi-stage ranking system to provide similar virtual-experience recommendations. The recommendations are based on the content item that the user is currently playing, the user's play history, device features, context features, etc. These linked content items are shown to the user while playing the current content item so that he or she can choose to be teleported to any linked content item. The original content item's developer can be paid an ads fee by the developer of the new content item.

As shown in FIG. 3, the recommender system 300 includes a plurality of candidate generators 304 that identify a plurality of content items from the content corpus 302

(e.g., corpus of virtual experiences on the platform). At least one of the candidate generators 304 may identify eligible content items within the content corpus 302. For example, certain content items may be deemed ineligible for a particular user, e.g., based on user age (e.g., a 15-year-old user is ineligible for experiences that are for 17+ users); location (e.g., a user in India may be ineligible for experiences that are marked US-only); user device capabilities (e.g., processing, network, battery, etc.); etc. Further, certain content items may be deemed ineligible for other reasons, e.g., restrictions specified by the developer of the content item, restrictions due to server capacity, network capacity, etc.

At least one of the candidate generators 304 may be implemented as a deep neural network (DNN)-based two-tower model. The DNN-based two-tower model may include a user tower and an item tower. To provide similar virtual-experience recommendations, the features from the current content item that the user is playing may be used as input features, in addition to other user features or context features. Through predicting the probability of an experience that a user would play next, the model learns to retrieve the most relevant experiences based on the current experience features, user features, and context features (e.g., client device capabilities, user-sequence features, etc.). Details for training of the two-tower model are provided below with reference to FIG. 4.

Figure 5:
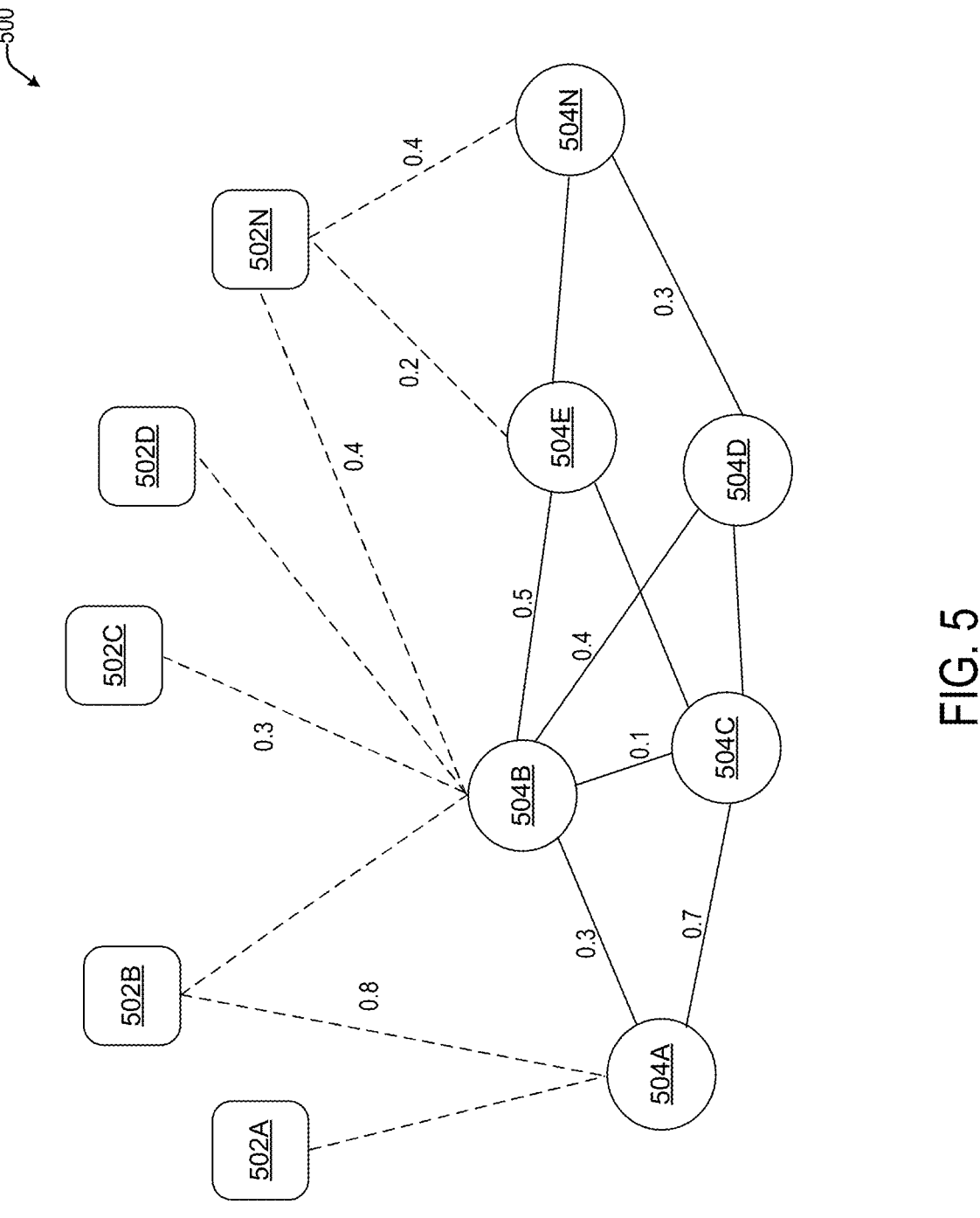
FIG. 5 illustrates an example experience co-play graph, in accordance with some implementations.

In some implementations, at least one of the candidate generators 304 may be implemented as an experience co-play model. The experience co-play model may generate an experience co-play graph to identify experiences that are most frequently co-played with the current content item. The experience co-play model may be effective for identifying new experiences for which there is too little training data to train the two-tower model. For instance, the experience co-play graph may indicate the respective vector distances between different user embeddings and the subset of candidate content items co-played with the current content item. A non-limiting example of a co-play graph is shown in FIG. 5.

Using the two-tower model and the experience co-play model, a set of the most relevant content items can be retrieved from the overall content corpus 302 on the platform.

In addition to the two-tower model and the co-play model, the candidate generators 304 may include one or more of the example candidate generators 204 described above with reference to FIG. 2.

Still referring to FIG. 3, one or more neural-network reranker(s) 306 may be utilized to assign ranks to the retrieved content items, filter the ranked content items, and select one or more content items that are sent to a client device to display to the user as in-experience recommendations 308. The neural-network rerankers 306 may be designed to optimize for engagement, retention, and/or revenue.

In some implementations, the recommender system 300 may be initiated when a user is engaged with an experience, and the probability of virtual item purchase and/or the probability of a length of engagement meeting a threshold length is low. In this situation, the recommender system 300 presents a recommended list of relevant experiences that the user may enjoy. The user can be teleported to another experience when they click on the associated link in the in-experience recommendations 308. In different implementations, the recommender system 300 may be implemented as part of a virtual-experience application 112/120 and/or part of virtual-experience engine 104. While the description herein refers to recommendations of content items in the context of a virtual-experience platform (virtual environment) that includes virtual experiences, the techniques described herein are usable in any recommendation context, e.g., where the content items have semantic information (in one or modalities such as text, image, video, etc.).

By removing the friction of discovering a new experience, the recommender system 300 reduces the time taken by the user to find and select a new relevant experience, which they may not have otherwise found. This can increase the chances of user retention and satisfaction. It also provides a seamless and uninterrupted experience to the user, which enables continuous engagement.

Training of Deep Neural Network (DNN): Candidate Content-Item Two-Tower Model

Figure 4:
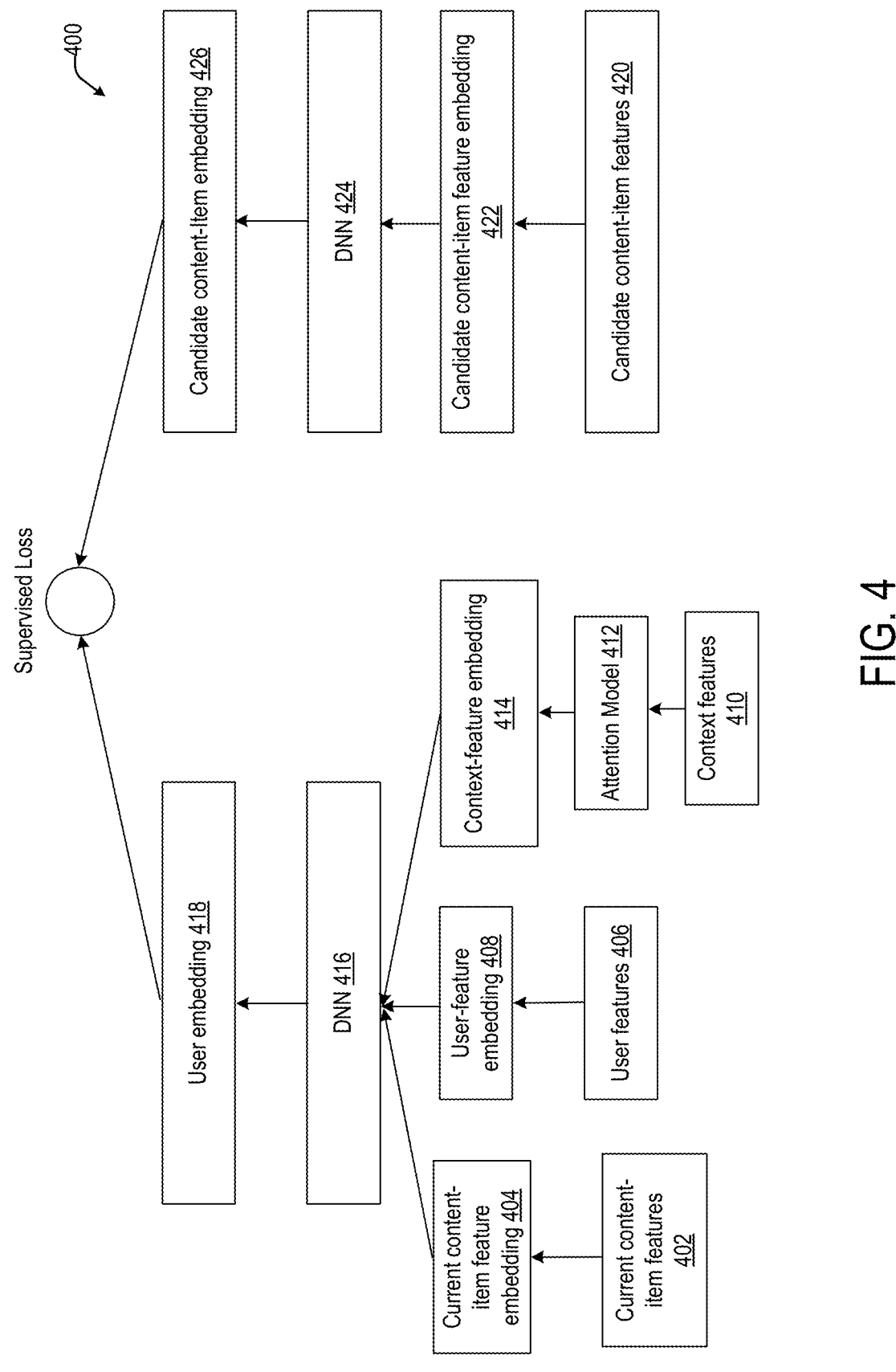
FIG. 4 illustrates an example architecture of a candidate content item two-tower model, in accordance with some implementations.

FIG. 4 illustrates an example architecture of a candidate content-item two-tower model 400, in accordance with some implementations. The two-tower model 400 includes a left tower (blocks 402-418) that generates user embeddings and a right tower (blocks 420-426) that generates content-item embeddings. The left tower may be utilized to calculate the user embedding for a particular user that engages with a current content item.

In some implementations, the user-content item two tower model may be utilized to train deep neural network (DNN) 416 and DNN 424 to generate respective user embeddings and content-item embeddings. The training data may include a plurality of pairs of users and candidate content items (e.g., user, candidate content item) that have a groundtruth association. The groundtruth association may be determined based at least in part on context features 410 that are associated with the user and current content item in the pair.

The context features 410 may include, client device processing/display capabilities, user-sequence features, etc. The user sequences may include a time-ordered list of user-engagement activities that originate with the current content item. In various implementations, the plurality of pairs may be obtained automatically (based on prior user activity on the virtual-experience platform) and/or may be specific by the users (e.g., a user may provide a rating for a content item, indicating their level of interest in that content item). The plurality of pairs in the training data may also include other pairs of users and candidate content items, where there is no groundtruth association (e.g., unknown relationship) and/or negative association (user expresses disinterest in the content item).

During training, in the left tower, current content-item feature embedding 404 may be calculated from the current content-item features 402 for each current content item in the plurality of pairs. The current content-item features 402 may include one or more of item metadata (e.g., title, developer name, rating on the platform, item type, etc.) as well as text, audio, and visual information, such as image or video, associated with the item. The current content-item feature embedding 404 may be generated by encoding the current content-item features 402 using a multimodal transformer and/or a cross-modal transformer that unifies the encoding across the various types of data in the current content-item features 402.

User-feature embedding 408 may be calculated from user features 406 for each user in the plurality of pairs. The user-feature embedding 408 may be generated by encoding the user features 406 using a multimodal transformer and/or a cross-modal transformer that unifies the encoding across the various types of data in the user features 406.

Context-feature embeddings 414 may be calculated by inputting the context features 410 into an attention model

412. The context features 410 may, e.g., client device capabilities, user-sequence features, etc. The client device capabilities may include, e.g., processing capabilities, display resolution, etc. The user-sequence features may include a time-ordered list of user-engagement activities. For instance, the user-sequence features may indicate the user engaged with the current content item without switching to the candidate content item or any other content items, the user switching from the current content item to another content item that is not associated with the pair, the user switching from the current content item directly to the candidate content item, the user switching from the current content item to the candidate content item by way of another content item (an indirect switching to the candidate content item), the length of engagement with another content item not associated with the pair after switching from the current content item, the length of engagement with the candidate content item after switching (directly or indirectly) from the current content item, etc.

The attention model 412 may assign various weights to each of the context features 410 to generate the context-feature embedding 414. The calculated current content item-feature embeddings 404, the user-feature embeddings 408, and the context-feature embeddings 414 are provided to a first DNN 416 that generates a user embedding 418 based on the current content item-feature embeddings 404, the user-feature embeddings 408, and the context-feature embeddings 414.

Further, during training, in the right tower, candidate content-item feature embeddings 422 may be calculated from candidate content-item features 420 for each candidate content item in the plurality of pairs. The candidate content-item features 420 may include one or more of item metadata (e.g., title, developer name, rating on the platform, item type, etc.) as well as text, audio, and visual information, such as image or video, associated with the item. The candidate content-item feature embedding 422 may be generated by encoding the candidate content-item features 420 using a multimodal transformer and/or a cross-modal transformer that unifies the encoding across the various types of data in the candidate content-item features 420. The calculated candidate content-item feature embeddings 422 are provided to a second DNN 424 that generates a candidate content-item embedding 426 based on the candidate content-item feature embeddings 420.

Further, during training, a supervised loss may be calculated as a vector distance between the user embedding 418 and the candidate content-item embedding 426 for each pair. The loss function is selected such that for pairs where there is the groundtruth association, the loss is minimized. In other words, the vector distance between the user embedding 418 and the candidate content-item embedding 426 is low for such pairs, whereas the vector distance in the absence of the groundtruth association is high. The loss value is utilized to adjust one or more parameters of DNN 416 and/or DNN 424. After the adjusting, the respective embeddings generated by DNN 416 and DNN 424 are closer in vector space for pairs with the groundtruth association. The training may be performed with a stopping criterion, e.g., compute budget exhausted, training data exhausted, threshold number of training epochs being completed, improvement between consecutive training iterations falling below a threshold, etc. Upon completion of the training, the left tower and the right tower can be utilized separately to generate user embeddings and candidate content-item embeddings for incoming data in an inference phase.

Experience Co-Play Model

FIG. 5 illustrates an example experience co-play graph 500, in accordance with some implementations. The experience co-play graph 500 may indicate the respective vector distances between different user embeddings 502A, 502B, 502C, . . . , 502N and the subset of candidate content items 504A, 504B, 504C, . . . 504N co-played with the current content item.

Identifying Candidate Content Items Using Impression-Distribution Mix

FIG. 6 is a flowchart illustrating an example method 600 to recommend content items, in accordance with some implementations. The method of FIG. 6 is implemented with specific user permission to access user data such as purchase history (e.g., of developer items such as avatar accessories, or other developer items), past play history (participation in one or more virtual experiences), context features such as the user-device type (e.g., desktop/laptop, smartphone, tablet, game console, or other computing device), user location (e.g., country), user language, or other features. In some implementations, the method of FIG. 6 may be used to implement one or more candidate generators 204. In different implementations, method 600 may be implemented as part of a virtual-experience application 112/120 and/or part of virtual-experience engine 104.

Method 600 begins at block 602. At block 602, candidate content items from a set of eligible candidate content items is identified. In some implementations, the candidate content items are identified using a plurality of candidate generators. The plurality of candidate generators includes two or more of a retention-based candidate generator, a semantic-similarity candidate generator, an engagement-similarity candidate generator, a behavior-similarity candidate generator, or user-data candidate generator. In some implementations, noise may be input into the plurality of candidate generators. A number of content items in the set of eligible content items is higher with the noise input than without the noise input. Block 604 may follow block 602.

At block 604, a corresponding rank to each of the candidate content items using an objective function that mitigates a popularity bias among the candidate content items is assigned. In some implementations, the objective function includes an inverse dominance term to mitigate the popularity bias among the candidate content items. In some implementations, the objective function includes a parameter value that controls an amount of mitigation for the popularity bias. Block 606 may follow block 604.

At block 606, an impression-distribution mix of the ranked candidate content items is determined. In some implementations, determining the impression-distribution mix includes determining the impression-distribution mix using a PID controller. Block 608 may follow block 606.

At block 608, one or more of the ranked candidate content items is caused to be displayed based on the impression-distribution mix.

Identifying Candidate Content Items for In-Experience Display

FIG. 7 is a flowchart illustrating an example method 700 to recommend content items, in accordance with some implementations. The method of FIG. 7 is implemented with specific user permission to access user data such as purchase history (e.g., of developer items such as avatar accessories, or other developer items), past play history (participation in one or more virtual experiences), context features such as the user-device type (e.g., desktop/laptop, smartphone, tablet, game console, or other computing device), user location (e.g., country), user language, or other features. In some implementations, the method of FIG. 7 may be used to implement one or more candidate generators 304. In different implementations, method 700 may be implemented as part of a virtual-experience application 112/120 and/or part of virtual-experience engine 104. Optional operations are indicated with dashed lines in FIG. 7.

Method 700 begins at block 702. At block 702, user-feature embeddings are obtained using a user tower that encodes user features into the user-feature embeddings. Block 704 may follow block 702.

At block 704, current content item feature embeddings using an item tower that encodes content item features into the current content item feature embeddings are obtained. Block 706 may follow block 704.

At block 706, context feature embeddings based on context features are obtained. In some implementations, obtaining the context feature embeddings is performed using an attention model. In some implementations, the context features include one or more of client device capabilities or user-sequence features. In some implementations, the user-sequence features include a time-ordered list of user engagement activities. Block 708 may follow block 706.

At block 708, a user embedding is generated based on the user-feature embeddings and the current content item feature embeddings using a first DNN. In some implementations, generating the user embedding using the first DNN is further based on the context feature embeddings. In some implementations, the first DNN is from a first tower of a two tower model that includes a second trained DNN from a second tower, and wherein the first DNN and the second trained DNN are trained to output user embeddings and content item embeddings, respectively, that are close in vector space for user-content item pairs that have a groundtruth association and that are distant in vector space for user-content item pairs that do not have the groundtruth association. Block 710 may follow block 708.

At block 710, a plurality of candidate content items are identified for recommendation to a user. Block 712 may follow block 710.

At block 712, an experience co-play graph is obtained that indicates respective vector distances between the user embedding and at least a subset of the candidate content items co-played with the current content item. Block 714 may follow block 712.

At block 714, particular content items of the candidate content items that are associated with respective content item embeddings that are within a threshold distance of the user embedding are selected. In some implementations, selecting the one or more content items is based on the respective vector distances in the experience co-play graph. Block 716 may follow block 714.

At block 716, one or more of the particular candidate content items are provided to a client device for display within a current content item in a user interface.

Figure 8:
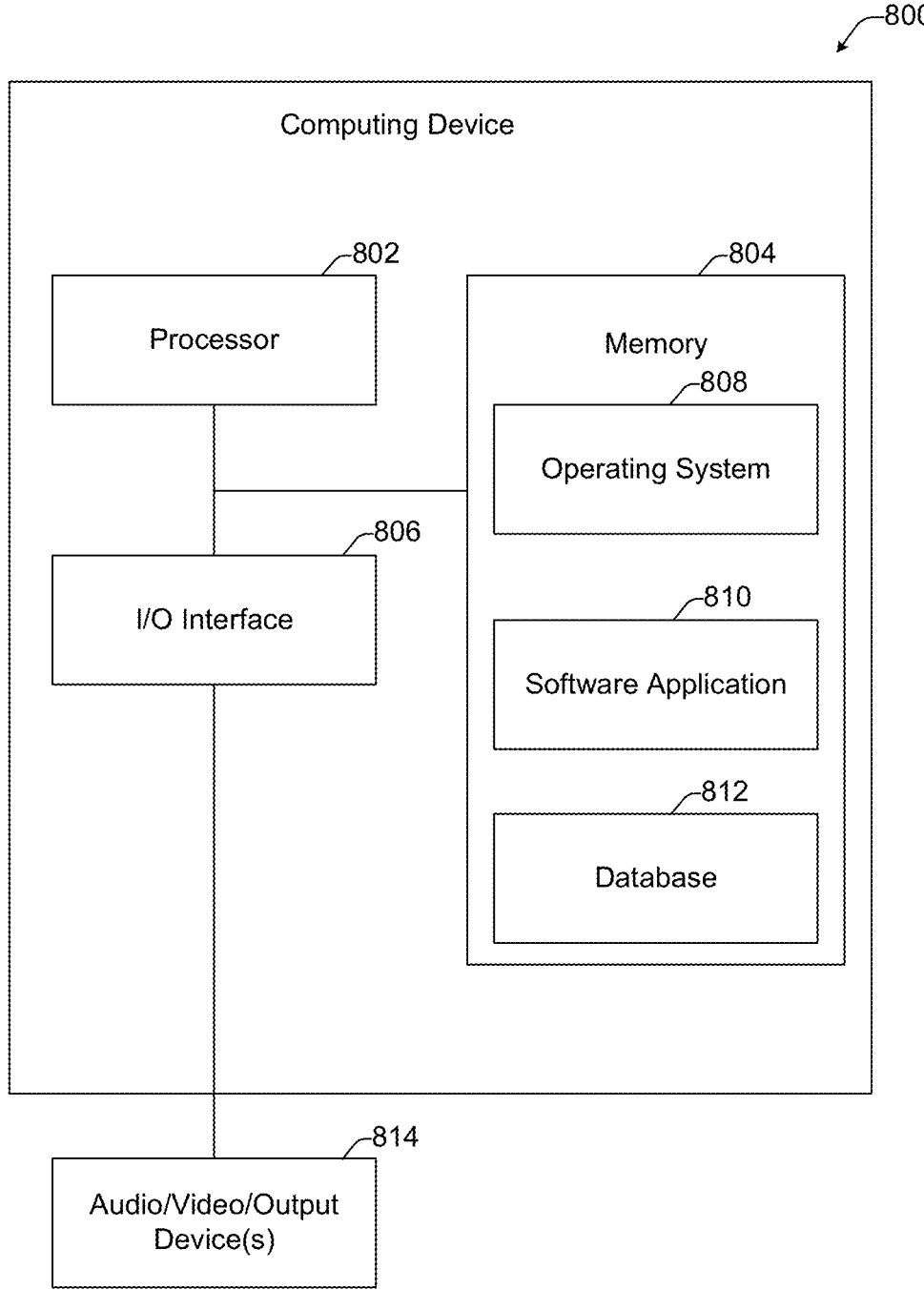
FIG. 8 is a block diagram illustrating an example computing device, in accordance with some implementations.

FIG. 8: Computing Devices

Hereinafter, a more detailed description of various computing devices that may be used to implement different devices and/or components illustrated in FIG. 1 is provided with reference to FIG. 8.

FIG. 8 is a block diagram of an example computing device 800 which may be used to implement one or more features described herein, in accordance with some implementations. In one example, device 800 may be used to implement a computer device, (e.g., 102, 110 of FIG. 1), and perform appropriate operations as described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, headphones, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the computing device 800 by the processor 802, including an operating system 808, software application 810, and associated database 812. In some implementations, the software application 810 can include instructions that enable processor 802 to perform the functions described herein. Software application 810 may include some or all of the functionality required to perform the operations described above with reference to FIGS. 2-5. In some implementations, one or more portions of software application 810 may be implemented in dedicated hardware such as an application-specific integrated circuit (ASIC), a programmable logic device (PLD), a field-programmable gate array (FPGA), a machine learning processor, etc. In some implementations, one or more portions of software application 810 may be implemented in general purpose processors, such as a central processing unit (CPU) or a graphics processing unit (GPU). In various implementations, suitable combinations of dedicated and/or general-purpose processing hardware may be used to implement software application 810.

For example, software application 810 stored in memory 804 can include instructions for retrieving user features, current content-item features, context features, candidate content-item features, for displaying and/or presenting content-item recommendations, and/or other functionality or software such as virtual-experience engine 104, and/or virtual-experience application 112. Any software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the computing device 800 with other systems and devices. For example, network communication devices, storage devices (e.g., memory and/or storage device(s) 124), and input/output devices can communicate via I/O interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, operating system 808, software application 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein. While the online virtual-experience platform 102 are described as performing operations as described in some implementations herein, any suitable component or combination of components of online virtual-experience platform 102, or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., method 600 and 700) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the live feedback data for output (e.g., for display). In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
identifying candidate content items from a set of eligible content items;

assigning a corresponding rank to each of the candidate content items using an objective function that mitigates a popularity bias among the candidate content items, wherein the objective function comprises an inverse dominance term to mitigate the popularity bias among the candidate content items, and wherein the inverse dominance term is 1 divided by a logarithm of a number of impressions corresponding to a subset of the candidate content items recorded during a time period;

inputting first noise into the objective function which is included in a recommender system of a computing device, wherein the first noise is inputted into the objective function using dithering, and wherein inputting the first noise promotes less bias in the ranked candidate content items by increasing an ability of the computing device to learn content and impression incrementally:

determining an impression-distribution mix of the ranked candidate content items; and causing one or more of the ranked candidate content items to be displayed based on the impression-distribution mix.

2. The computer-implemented method of claim 1, wherein the objective function further comprises a parameter value that controls an amount of mitigation for the popularity bias.

3. The computer-implemented method of claim 1, wherein determining the impression-distribution mix comprises determining the impression-distribution mix using a proportional-integral-derivative (PID) controller.

4. The computer-implemented method of claim 1, wherein the candidate content items are identified using a plurality of candidate generators.

5. The computer-implemented method of claim 4, wherein the plurality of candidate generators includes two or more of a retention-based candidate generator, a semantic-similarity candidate generator, an engagement-similarity candidate generator, a behavior-similarity candidate generator, or user-data candidate generator.

6. The computer-implemented method of claim 4, further comprising:

inputting second noise into the plurality of candidate generators which are included in the recommender system of the computing device, wherein the second noise is inputted into the plurality of candidate generators using dithering, wherein inputting the second noise promotes a discovery capability of the computing device by increasing a likelihood of the computing device discovering content items that otherwise would not be included in the set of eligible content items, and wherein a number of content items in the set of eligible content items is higher with the second noise input than without the second noise input.

7. A non-transitory computer-readable medium with instructions stored thereon that, when executed by one or more hardware processors, cause the one or more hardware processors to perform operations comprising:

identifying candidate content items from a set of eligible content items;

assigning a corresponding rank to each of the candidate content items using an objective function that mitigates a popularity bias among the candidate content items, wherein the objective function comprises an inverse dominance term to mitigate the popularity bias among the candidate content items, and wherein the inverse dominance term is 1 divided by a logarithm of a number of impressions corresponding to a subset of the candidate content items recorded during a time period;

inputting first noise into the objective function which is included in a recommender system of a computing device having the one or more hardware processors, wherein the first noise is inputted into the objective function using dithering, and wherein inputting the first noise promotes less bias in the ranked candidate content items by increasing an ability of the computing device to learn content and impression incrementally;

determining an impression-distribution mix of the ranked candidate content items; and causing one or more of the ranked candidate content items to be displayed based on the impression-distribution mix.

8. The non-transitory computer-readable medium of claim 7, wherein the objective function further comprises a parameter value that controls an amount of mitigation for the popularity bias.

9. The non-transitory computer-readable medium of claim 7, wherein determining the impression-distribution mix comprises determining the impression-distribution mix using a proportional-integral-derivative (PID) controller.

10. The non-transitory computer-readable medium of claim 7, wherein the candidate content items are identified using a plurality of candidate generators.

11. The non-transitory computer-readable medium of claim 10, wherein the plurality of candidate generators includes two or more of a retention-based candidate generator, a semantic-similarity candidate generator, an engagement-similarity candidate generator, a behavior-similarity candidate generator, or user-data candidate generator.

12. The non-transitory computer-readable medium of claim 10, wherein the operations further comprise:

inputting second noise into the plurality of candidate generators which are included in the recommender system of the computing device, wherein the second noise is inputted into the plurality of candidate generators using dithering, wherein inputting the second noise promotes a discovery capability of the computing device by increasing a likelihood of the computing device discovering content items that otherwise would not be included in the set of eligible content items, and wherein a number of content items in the set of eligible content items is higher with the second noise input than without the second noise input.

13. A computing device, comprising:

one or more hardware processors; and a non-transitory computer readable medium coupled to the one or more hardware processors, with instructions stored thereon, that when executed by the one or more hardware processors cause the one or more hardware processors to perform operations comprising:

identifying candidate content items from a set of eligible content items;

assigning a corresponding rank to each of the candidate content items using an objective function that mitigates a popularity bias among the candidate content items, wherein the objective function comprises an inverse dominance term to mitigate the popularity bias among the candidate content items, and wherein the inverse dominance term is 1 divided by a logarithm of a number of impressions corresponding to a subset of the candidate content items recorded during a time period;

inputting noise into the objective function which is included in a recommender system of the computing device, wherein the noise is inputted into the objective function using dithering, and wherein inputting the noise promotes less bias in the ranked candidate content items by increasing an ability of the computing device to learn content and impression incrementally;

determining an impression-distribution mix of the ranked candidate content items; and causing one or more of the ranked candidate content items to be displayed based on the impression-distribution mix.

14. The computing device of claim 13, wherein the objective function further comprises a parameter value that controls an amount of mitigation for the popularity bias.

15. The computing device of claim 13, wherein determining the impression-distribution mix comprises determining the impression-distribution mix using a proportional-integral-derivative (PID) controller.

16. The computing device of claim 13, wherein the candidate content items are identified using a plurality of candidate generators.

17. The computing device of claim 16, wherein the plurality of candidate generators includes two or more of a retention-based candidate generator, a semantic-similarity candidate generator, an engagement-similarity candidate generator, a behavior-similarity candidate generator, or user-data candidate generator.

* * * * *